No. 687,410. Patented Nov. 26, 1901.
W. R. SHRADER.
HORSE HAY RAKE.
(Application filed Mar. 11, 1901.)
(No Model.) 2 Sheets—Sheet 1.
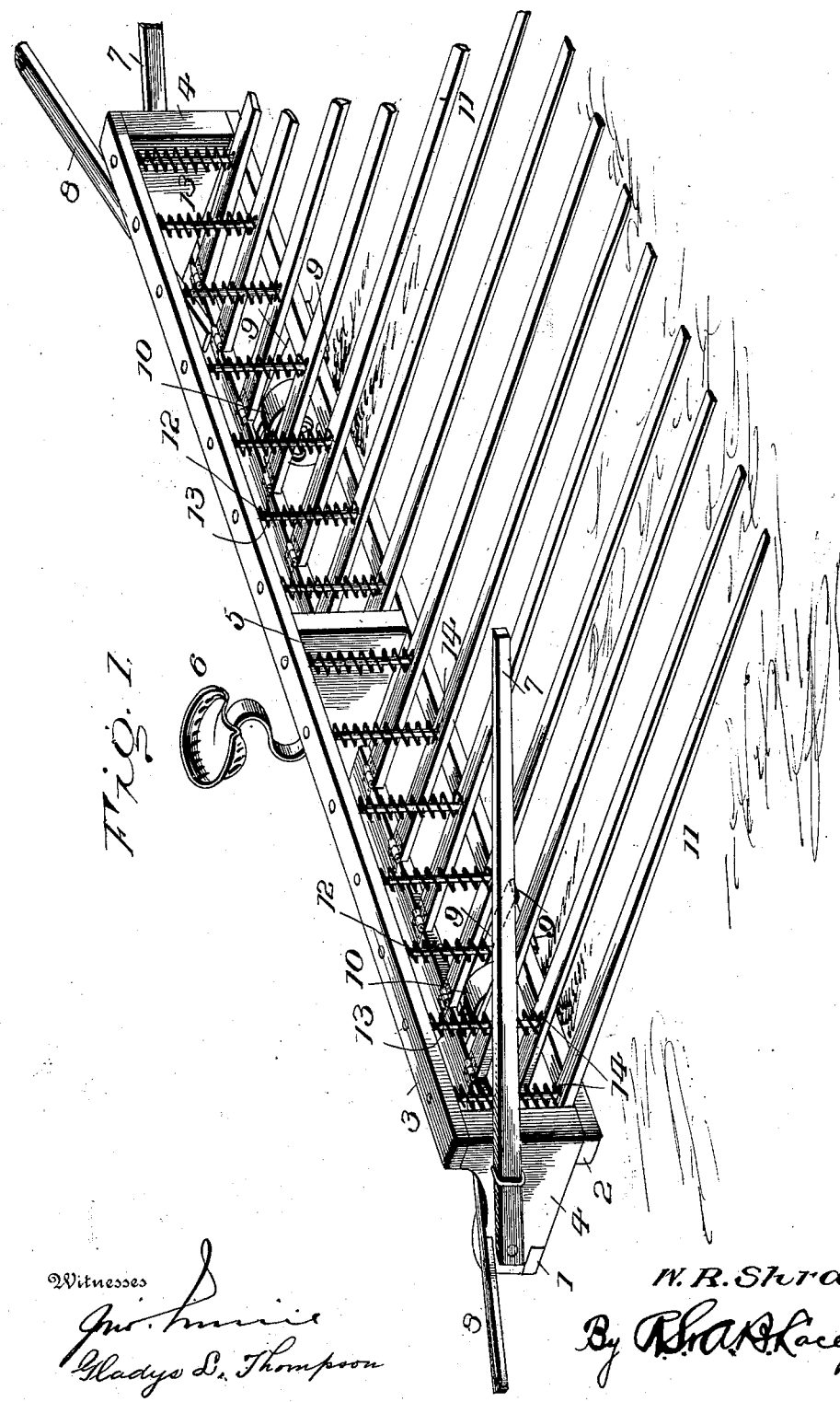

No. 687,410. Patented Nov. 26, 1901.
W. R. SHRADER.
HORSE HAY RAKE.
(Application filed Mar. 11, 1901.)
(No Model.) 2 Sheets—Sheet 2.
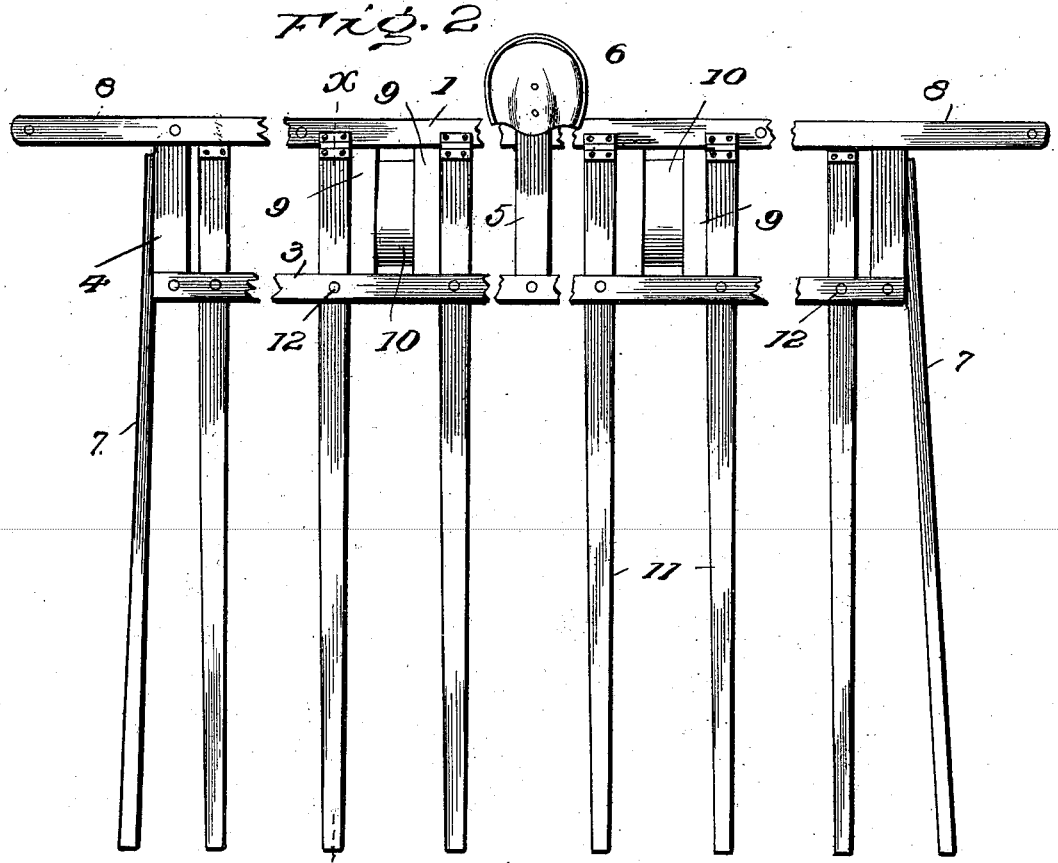
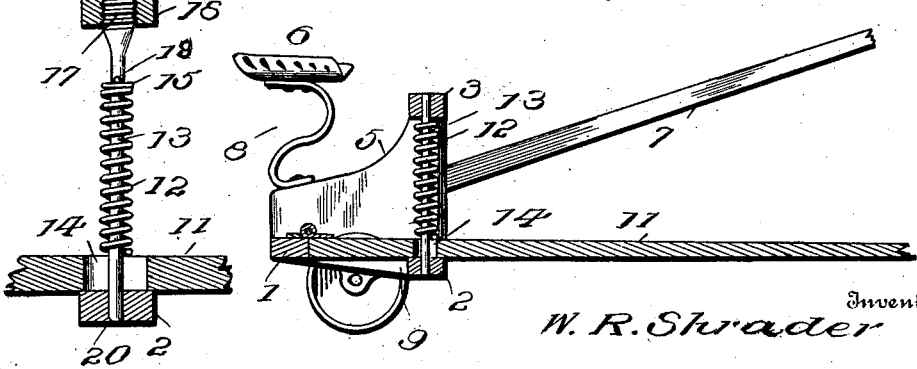
Witnesses Inventor
W. R. Shrader
By Lacey
Attorneys

UNITED STATES PATENT OFFICE.

WILLIAM R. SHRADER, OF NEW BOSTON, MISSOURI.

HORSE HAY-RAKE.

SPECIFICATION forming part of Letters Patent No. 687,410, dated November 26, 1901.

Application filed March 11, 1901. Serial No. 50,631. (No model.)

*To all whom it may concern:*

Be it known that I, WILLIAM R. SHRADER, a citizen of the United States, residing at New Boston, in the county of Linn and State of Missouri, have invented certain new and useful Improvements in Horse Hay-Rakes; and I do hereby declare the following to be a full, clear, and exact description of the invention, such as will enable others skilled in the art to which it appertains to make and use the same.

This invention belongs to that class of field implements for agricultural pursuits which gather the grain, hay, and the like into bunches or shocks after it has been mowed and cured.

The chief feature of the invention is the construction whereby all the cut grain or hay in the path of the rake is gathered, the teeth conforming to the surface being mounted to yield instead of having rigid connection with the head, as is usual.

For a full description of the invention and the merits thereof, and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of a horse hay-rake constructed in accordance with and embodying the essential features of the invention. Fig. 2 is a top plan view. Fig. 3 is a longitudinal section about on the line X X of Fig. 2. Fig. 4 is a section similar to Fig. 3, showing means for regulating the tension of the springs and admitting of the ready removal of the guide-rod when it is required to detach a tooth for any purpose.

Corresponding and like parts are referred to in the following description and indicated in all the views of the drawings by the same reference characters.

In general outline the rake is of ordinary appearance and comprises the well-known parts—namely, a head, teeth, driver's seat, and hitching connections.

The rake-head consists, essentially, of three bars 1, 2, and 3, arranged in parallel relation and connected at their ends and at a point midway between their ends. The bars 1 and 2 are arranged substantially in the same horizontal plane, the one in advance of the other, and the bar 3 is located directly above the bar 2. The end pieces 4 and the central piece 5 are approximately of triangular shape, and the several bars 1, 2, and 3 are rigidly and firmly connected thereto, so as to provide a substantial structure. The seat 6 is attached to the central piece 5, and the poles 7 are connected to the end pieces 4 and are forwardly and upwardly divergent. The draft-bars 8 are connected about midway of their ends to the rear portions of the end pieces 4 and their inner ends are attached to the bar 1. The draft-bars incline upwardly and outwardly, and the horses are attached to their outer ends in the usual manner. Pairs of bars 9 are connected at their ends to the bars 1 and 2 and support ground-wheels 10, upon which the rake or implement is supported and runs when in operation.

The rake-teeth 11 are hinged or pivotally connected at their rear ends to the bar 1 and extend over the bar 2 and are adapted to move vertically at their forward or free ends, so as to conform to the surface of the ground over which the implement is drawn, thereby insuring the gathering of all or practically all the hay or grain. Springs 12 hold the rake-teeth 11 down to their work and are interposed between the bar 3 and the top side of the respective teeth, it being understood that a spring is supplied for each tooth. A rod 13 is had for each spring and tooth and forms a guide therefor and is supported at its ends in the bars 2 and 3 and passes through a slot or elongated opening 14 of the tooth, thereby admitting of the vertical movements of the free end of the teeth without binding. The slot or opening 14 is of a width corresponding to the diameter of the guide-rod 13, so as to prevent appreciable lateral play of the teeth at their forward ends. The rods 13, besides forming guides for the rake-teeth, also support the tension-springs 12 and hold them in place.

It is desirable to make provision for varying the tension of the springs 12 according to the nature of the soil and the character of work, a hard and stony surface requiring stiff springs and meadow or mellow land requiring springs of light tension in order to prevent forcing of the points of the teeth into the surface. In order to meet these varying conditions, it is contemplated to supply means for increasing or decreasing the tension of the springs 12, and, as shown in Fig. 4, the upper end of each guide-rod 13 may have screw-thread connection either with the bar 3 or a part 18, secured to said bar, to admit of vertical adjustment of the said rod, and a stop 15 is applied to the upper end portion of each guide-rod to form a point of resistance for the upper end of the spring 12, whereby the latter is compressed more or less, according to the adjustment of the rod 13. The upper end of each rod 13 is made square, as shown at 16, or otherwise constructed to receive a wrench or tool 19ª, by means of which the rod is rotated either to the right or to the left, and the threaded portion 17 is of larger diameter than the body of the rod to admit of the withdrawal of said rod through the opening in the bar 3 when it is required to remove a spring 12 or tooth 11. A nut or threaded plate 18 is fitted to the lower side of the bar 3, and the threaded portion 17 of the guide-rod coöperates therewith. A stop 15 consists of a washer loosely fitted upon the rod 13 and prevented from upward movement by means of a pin or key 19, fitted in a transverse opening of the said rod. The lower end of the guide-rod is adapted to move freely in the opening 20 in the bar 2, in which it has a snug fit, so as to prevent any play. When it is required to remove a guide-rod, the pin 19 is withdrawn, thereby permitting said rod to be removed through the threaded opening of the bar 3 and nut 18, as will be readily comprehended.

Having thus described the invention, what is claimed as new is—

1. In a horse hay-rake, a rake-head comprising front, rear and an upper bar disposed in parallel relation, rake-teeth having hinge or pivotal connection at their rear ends with the rear bar and normally resting upon the front bar and having the portion crossing over the said front bar longitudinally slotted and adapted to move vertically at their forward ends, guide-rods supported at their ends in the said upper and front bars and passing through the aforesaid longitudinal slots of the rake-teeth, and springs mounted upon said rods and confined between the rake-teeth and the said upper bar and serving to hold the teeth in working position, substantially as set forth.

2. In a horse hay-rake, a rake-head comprising front, rear and an upper bar disposed in parallel relation, rake-teeth having hinge or pivotal connection at their rear ends with the rear bar and normally resting upon the front bar and adapted to move vertically at their forward ends, guide-rods supported at their ends in the said upper and front bars and passing through slots or elongated openings of the rake-teeth, springs mounted upon said rods and confined between the rake-teeth and the said upper bar and serving to hold the teeth in working position, and means for varying the tension of the springs so as to exert a greater or less pressure upon the rake-teeth, substantially as and for the purpose set forth.

3. In a horse hay-rake, front, rear and an upper bar rigidly connected and disposed in parallel relation, rake-teeth having hinge or pivotal connection with the rear bar and passing over and supported by the front bar and having elongated slots or openings, guide-rods removably fitted to the upper and front bars and having screw-thread connection with the said upper bar and passing through the slots of the respective rake-teeth, a washer and pin fitted to the upper portion of each guide-rod and constituting a stop, and springs mounted upon the guide-rods and confined between said stops thereof and the rake-teeth, substantially as and for the purpose set forth.

In testimony whereof I affix my signature in presence of two witnesses.

WILLIAM R. SHRADER. [L. S.]

Witnesses:
 H. V. JONES,
 J. M. JONES.